C. M. MANLY.

MOTOR VEHICLE.

APPLICATION FILED MAY 31, 1918.

Reissued Dec. 6, 1921.

15,243.

5 SHEETS—SHEET 1.

Inventor
Charles M. Manly,
by his
Attorney
W. B. Morton

C. M. MANLY.

MOTOR VEHICLE

APPLICATION FILED MAY 31, 1918

Reissued Dec. 6. 1921.

15,243.

5 SHEETS—SHEET 2.

Inventor
Charles M. Manly
By W. G. Thorson
his ATTORNEY.

C. M. MANLY.

MOTOR VEHICLE.

APPLICATION FILED MAY 31, 1918.

Reissued Dec. 6, 1921.

15,243.

5 SHEETS—SHEET 3.

Inventor
Charles M. Manly.
By his Attorney
W. B. Morton

C. M. MANLY.

MOTOR VEHICLE.

APPLICATION FILED MAY 31, 1918.

Reissued Dec. 6, 1921.

15,243.

5 SHEETS—SHEET 4.

Inventor
Charles M. Manly.

By his Attorney
W. B. Morton

C. M. MANLY.

MOTOR VEHICLE.

APPLICATION FILED MAY 31, 1918.

Reissued Dec. 6, 1921.

15,243.

5 SHEETS—SHEET 5.

Inventor
Charles M. Manly,
By his Attorney
W. B. Morton

UNITED STATES PATENT OFFICE.

CHARLES M. MANLY, OF BUFFALO, NEW YORK

MOTOR-VEHICLE.

15,243. Specification of Reissued Letters Patent. Reissued Dec. 6, 1921.

Original No. 1,179,736, dated April 18, 1916, Serial No. 606,613, filed February 4, 1911. Application for reissue filed May 31, 1918. Serial No. 237,600½.

*To all whom it may concern:*

Be it known that I, CHARLES M. MANLY, a citizen of the United States, residing at Buffalo, county of Erie, and State of New York, have invented certain new and useful Improvements in Motor-Vehicles, of which the following is a a specification.

My invention relates to motor vehicles, and more particularly to means for driving and steering the same.

One object of this invention is to provide improved, simple and effective means for applying power to the driving and steering of a vehicle.

A further object of the invention is to provide a vehicle with driving mechanism and controlling means therefor of such character that the vehicle may be guided by changing the relative speeds of the driving wheels on opposite sides of the vehicle and the use of the usual steering gear avoided.

A further object of the invention is to provide an improved caster or trailing wheel for a vehicle of the class described adapted to permit the direction of movement of the vehicle to be reversed without deflecting the vehicle from its path.

With these and other objects in view, my invention consists in the novel construction and arrangement of parts hereinafter described and more particularly pointed out in the claims.

In the drawings which illustrate one form in which my invention may be carried out:

Figs. 9, 10 and 11 are detail views of a modification hereinafter referred to.

Figure 1:
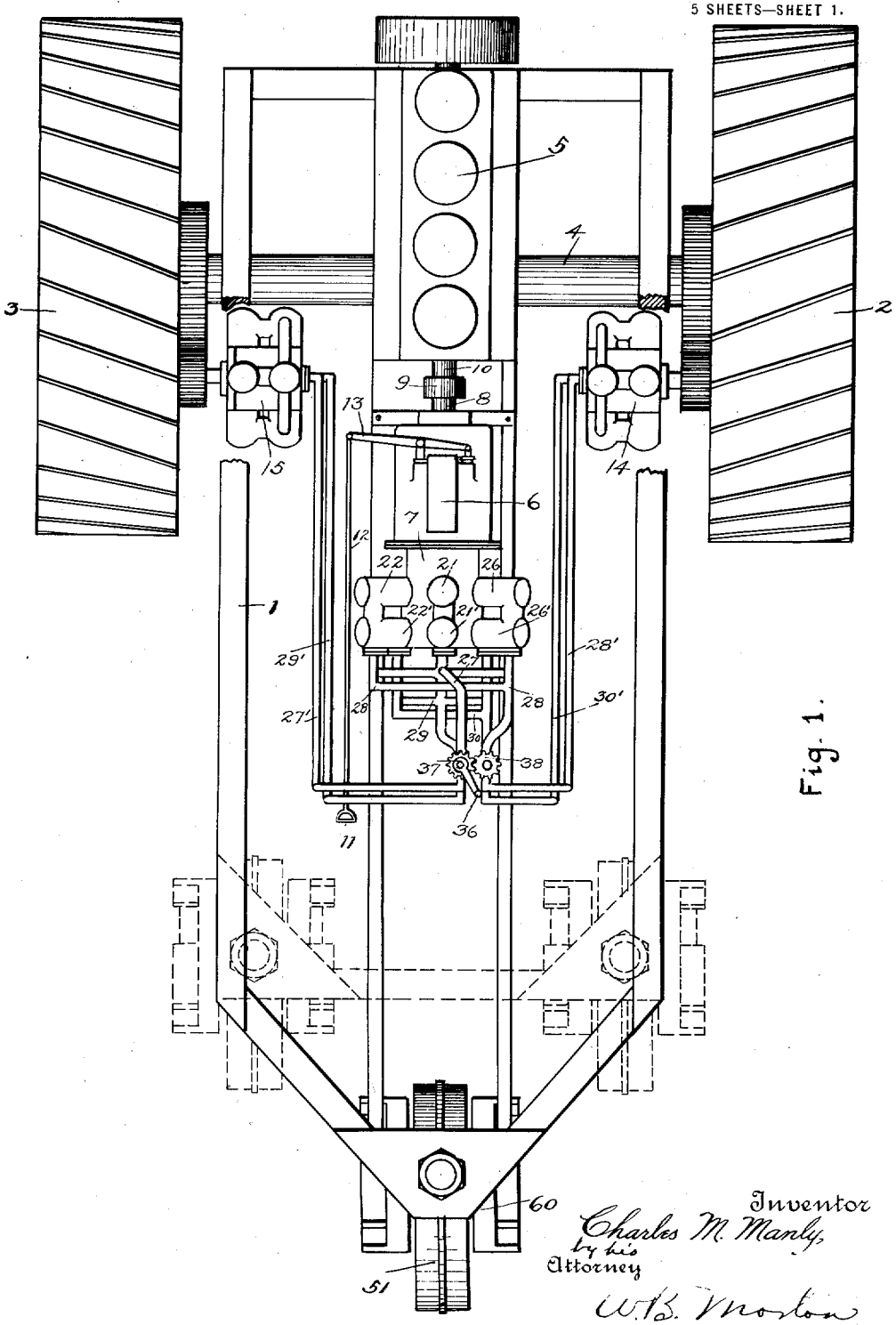
Figure 1 is a plan view of the working parts of the machine.

Referring to the drawings wherein the same reference numerals indicate the same or corresponding parts in all the figures, 1 is the main frame of the motor vehicle. 2 and 3 are driving wheels journaled on the dead axle 4, and 5 is an engine of any suitable type carried by said main frame 1.

An interial combustion engine is the kind shown herein but it will be obvious that any type of motor or engine adaptable to motor vehicles may be used in its stead.

Mounted on the frame 1 in alinement with the crank shaft 10 of the engine 4 is a multiple cylinder hydraulic pump 7 with its controlling mechanism casing 6; the crank shaft 8 of said pump being directly connected by a suitable joint 9 to the crank shaft 10 of the engine. This pump 7, is of the general type shown in my U. S. Letters Patent No. 801,097 and of the special type fully described in my Patent No. 1,212,791, granted January 16, 1917, and comprises a number of cylinders with pistons operating therein, the strokes of which are varied by varying the eccentricity of the common crank pin, said varying of the stroke of the crank pin being accomplished by any suitable means, controlled in any convenient manner, such as by handle 11 of rod 12, and lever 13, which is connected to said stroke varying means. As has been explained in the patents above referred to, the stroke of the common crank pin of the pump may be varied from a maximum on one side of zero, through zero, to a maximum on the other side, in which latter case the direction of flow of fluid is reversed, while when the pump stroke is at zero, no fluid is circulated in either direction. Each cylinder of a multiple cylinder pump of the type referred to is individually a pump having two passages which constitute, respectively, a suction and a pressure passage according to the direction of flow of the fluid as controlled by the stroke varying means. Heretofore the corresponding passages of all the cylinders have been connected together to form a common suction passage and a common pressure passage for the entire pump, which, when the pump is used to drive a motor, or motors, form the low pressure side and high pressure side respectively of a single fluid circuit. In the present case, however, the passages of the six individual cylinders, 21, 22, 23, 24, 25 and 26 are connected up in groups, here shown for convenience as two groups of three cylinders each, thus providing two separate and distinct pressure passages and two separate and distinct suction passages. In order to reduce the fluctuation of velocity of flow of the fluid in the separate passages as much as possible, each group comprises each alternate cylinder, but since all the cylinders have a common crank pin, any variation in the volume of fluid circulated by any one cylinder simultaneously occurs in all of the cylinders.

In the present instance the pump 7 is shown with the cylinders 21, 23 and 25 connected through their respective valve chambers 21′, 23′ and 25′ to the outer and inner manifolds 27 and 29 respectively, thus forming with the motor driven thereby, when the steering valve, hereinafter described is in its normal position, one separate and distinct fluid circuit, while cylinders 22, 24 and 26, through their respective valve chambers 22′, 24′ and 26′ are connected to the outer and inner manifolds, 28 and 30, respectively, thus forming the second circuit.

Figure 4:
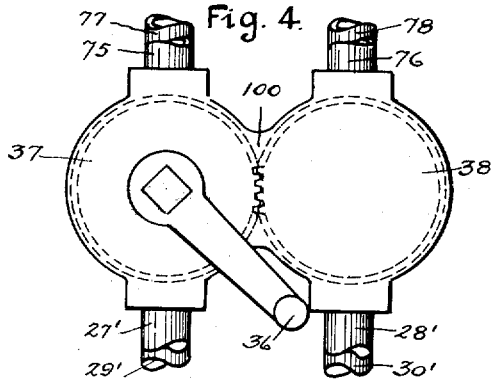
Fig. 4 is a top plan view of the steering valve detail.
Figure 6:
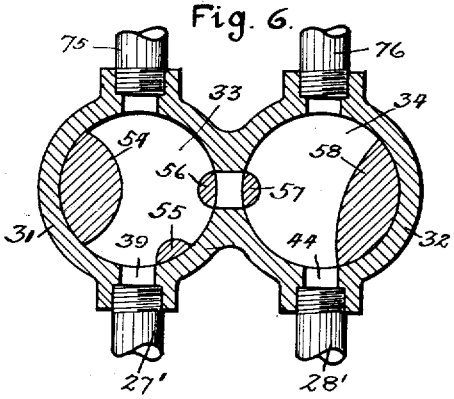
Fig. 6 is a section of the same on the line *a—a*, Fig. 5.
Figure 5:
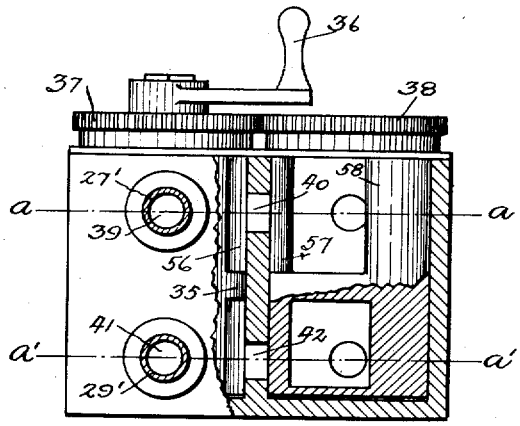
Fig. 5 is a side elevation of the same with parts cut away.

The manifold 27 is connected by its pipe 75 to the upper portion of the left hand chamber 31 of the steering valve 100, while the manifold 29 is connected by its pipe 77 to the lower portion of the same chamber. Similarly manifolds 28 and 30 are connected by the pipes 76 and 78 respectively to the upper and lower portions respectively of the right hand chamber 32 of the steering valve 100. Referring to Figs. 4, 5 and 6, it is seen that the said steering valve 100 is composed of two integral chambers 31 and 32, having upper and lower by-pass ports 40 and 42 respectively connecting the said chambers. The valve plug 33 which operates within said chamber 31 is formed with a solid circular bottom, three lobes 54, 55 and 56 extending up therefrom, a solid circular top, and a circular plate 35 in the middle thereof, dividing the said valve plug into two similar valve elements, one above the other, made in one piece and formed integrally with a gear 37 on the upper end.

The valve plug 34 for chamber 32 is constructed similarly with a gear 38 on the upper end thereof, but with only two vertical lobes 57 and 58.

From this steering valve 100 the pipes 27′ and 29′ 28′ and 30′ lead the fluid to and from motors 15 and 14 respectively. The said pipes 27′, 29′ and 28′ are connected to the valve 100 through ports 39, 41, 44 respectively and the pipe 30′ is connected through a port not shown but being in the lower half of the chamber 32 directly under port 44, a section on the line *a′—a′* of Fig. 5 being exactly similar to the section on line *a—a*, shown in Fig. 6.

The gears 37 and 38 on the valve plugs 33 and 34 respectively intermesh, and the lobes of the said valve plugs are so positioned that with the parts in the positions shown in the figures, lobes 56 and 57 both close the by-pass ports 40 and 42, while lobes 54, 55 and 58 are clear of the ports 39, 41 and 44 and the other one not shown.

A clockwise turning of handle 36 rigidly fastened to valve plug 33 producing counter-clockwise turning of valve plug 34, will cause the lobe 55 to pass on to and throttle ports 39 and 41, lobes 56 and 57 to pass from over and open by-pass ports 40 and 42, and lobe 58 to simply move away from port 44 and the one not shown, leaving the same fully open. A reverse movement of the handle 36 from the position shown will cause lobe 58 to pass on to and throttle ports 44 and the corresponding port not shown, lobes 56 and 57 to pass from over and open the by-pass ports 40 and 42, and lobe 55 simply to move away from ports 39 and 41, leaving the same fully open. Lobe 54 is simply a strengthening brace used for obvious mechanical reasons, and has no throttling function whatever.

The high pressure pipes of both circuits are both connected to either the upper or the lower ports of their respective chambers of the steering valve 100, while the low pressure pipes are similarly connected to either the lower or upper ports of their respective valve chambers.

The motors 14 and 15 may be multiple cylinder hydraulic motors of any well known type or they may be of the special type described in my application Serial No. 399,989, dated October 31, 1907, and may have any convenient number of cylinders, and may be of any size necessary to produce the desired maximum speed with reference to the speed of the pump at full stroke, and are geared to the drive wheels 2 and 3 respectively. With the motors so geared to the driving wheels 2 and 3 that given volumes of fluid delivered to said motors cause the said wheels to revolve at equal speeds, any variation in the relative volumes of fluid delivered to those motors will cause a corresponding variation in the relative speeds of their respective driving wheels, and consequently cause one end of the axle 4 to advance more rapidly than the other end, thus causing the vehicle to turn to one side or the other.

Figure 7:
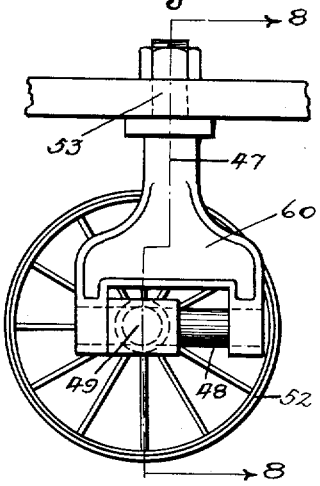
Figs. 7 and 8 are side elevation and vertical section respectively of the caster wheel.

In order better to allow the front or driving wheels to steer the vehicle by running at varying speeds, the rear wheel, or wheels, should be so constructed and mounted as to swing readily and follow the proper path with respect to the driving wheels. However, when an ordinary caster wheel is used the vehicle does not steer accurately when the direction of motion is reversed, but wabbles in various directions until the caster wheel has swung to the opposite side of its vertical pivot. This wabbling is very objectionable, since it is apt to result in a temporary loss of control of the machine and cause damage thereto. I obviate any such chance of wabbling by providing a caster or swivel 47, Fig. 7, with a forked shank, the forks 60 of which carry parallel rods 48 upon which slide bearings 49, carrying the axle 50 of the wheel 51, the latter being thus adapted to rotate and slide between the forks of swivel 47.

When the machine is traveling in the direction of the arrow (Fig. 7) the axle 50 of the wheel with its bearings 49 slides back on the rods 48 to the position shown and the trailing wheel effect is produced which allows the wheel to adjust itself readily to different angles of forward travel. However, should the machine be reversed and travel rearwardly the axle 50 would slide with its bearings 49 to the other end of the rods 48, and thus immediately produce the trailing wheel effect in the opposite direction, since the resistance encountered by the bearings 49 in sliding on the rods 48 is not so great as that of the whole wheel and swivel twisting against the grip of flange 52 on the road and the friction of the swivel bearing 53.

The operation of the machine is as follows: The pump control lever 13 being normally at the position for zero stroke of the pump when the engine 5 is started, no fluid is forced through the circuits and the vehicle is at rest. If it is desired to move straight forward the steering valve handle 36 is set at the neutral position shown, allowing both fluid circuits to operate independently, admitting the same amount of fluid to each motor since said motors are here shown with the same number of cylinders of equal capacity and require equal amounts of fluid for equal speeds. The handle 11 is then shoved, say forward, in a positive direction, gradually increasing the stroke of the pump pistons, and consequently the amount of fluid forced through the two circuits, thereby driving both the motors at the same speed in a forward direction. A reversal of the direction of travel of the vehicle is accomplished by simply pulling the handle 11 rearwardly through zero to a negative position, thus varying the stroke of the common crank pin through zero to some value on the negative side of zero. This varying of the common crank pin stroke causes the fluid to be forced in a reverse direction through the fluid circuits, consequently driving the motors at like speeds rearwardly.

Grasping the steering valve handle 36 with the other hand, the operator may easily steer and control the speed simultaneously. A clockwise movement of handle 36 will turn valve plug 33, which is fastened thereto, in a like direction, and plug 34 counterclockwise, as above described, thereby throttling ports 39 and 41 and opening by-pass ports 40 and 42 which connect chambers 31 and 32. This action of the valve cuts a certain amount of fluid from the cylinders 21, 23 and 25 off from passing to motor 15 and allows it to pass through port 40 (assuming that the upper half of the valve 100 is the high pressure side when running forward) into chamber 32, thence with the fluid from the cylinders 22, 24 and 26, to motor 14. The return fluid from motor 14 passes back through pipe 30′ to the lower, or low pressure side of the chamber 32, thence an amount equal to that by-passed in the upper chamber passes through by-pass port 42 to the lower part of chamber 31 and back into its original pump circuit. It will be seen that this operation causes more fluid to pass through motor 14 than through motor 15, thereby causing said motor 14 to rotate faster than motor 15, and consequently the wheel 2 rotates faster than wheel 3 and produces a turning movement to the left.

A movement of handle 36 in a counterclockwise direction producing precisely the opposite action of the valves 33 and 34, will allow more fluid to pass through motor 15 than through 14, thus driving said motor 15 faster than motor 14, consequently the wheel 3 travels faster than wheel 2 and produces a turning movement in a right hand direction.

When traveling rearwardly the action of the steering valve in controlling the relative speeds of the motors is precisely the same as above described with the exception that the lower half of said valve 100 is now the high pressure side, and the upper half the low pressure side. The result of driving the same wheels faster rearwardly is the same in steering as that attained while moving forward, as the rear wheel 51 operates as above described and allows perfect steering control.

From the above it will be seen that one man can without appreciable manual exertion accurately steer, and at the same time positively and perfectly control the speed of the motor vehicle.

Figure 2:
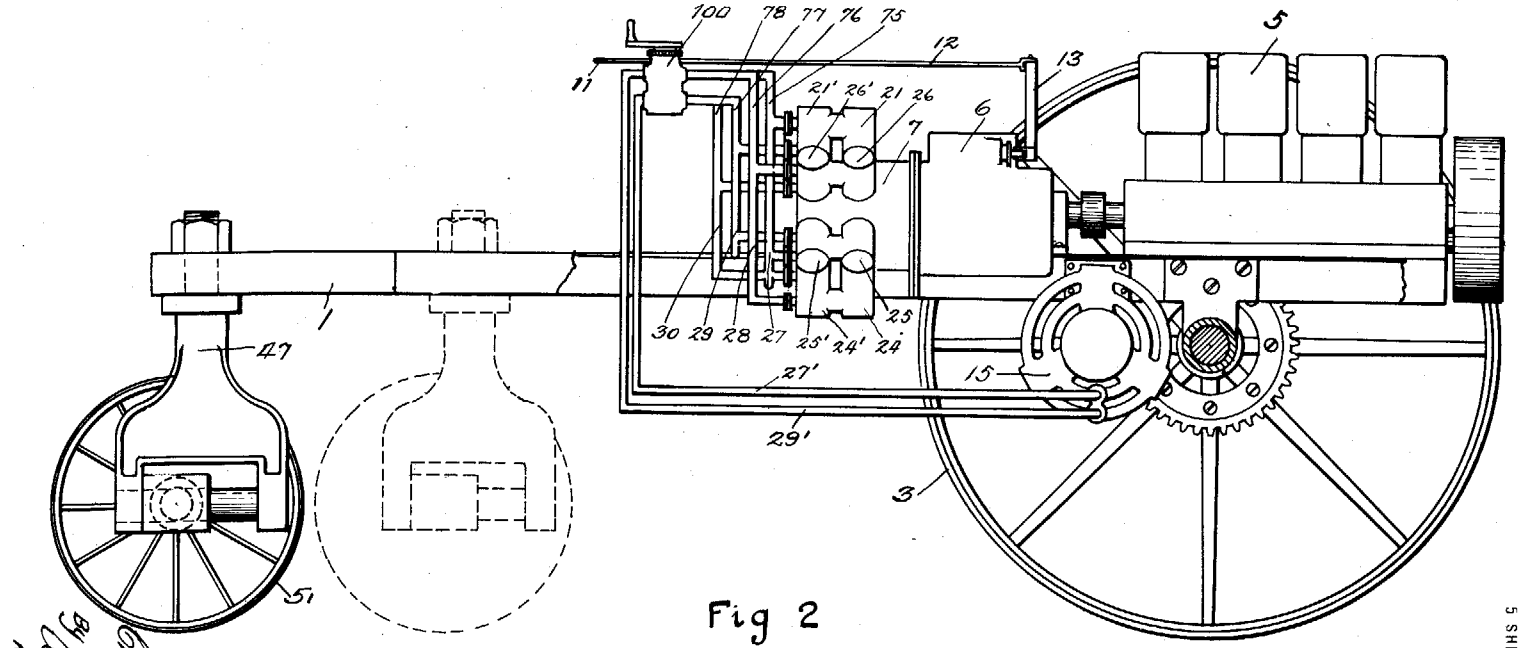
Fig. 2 is a side elevation of the same with one drive wheel and its coöperating parts cut away.
Figure 3:
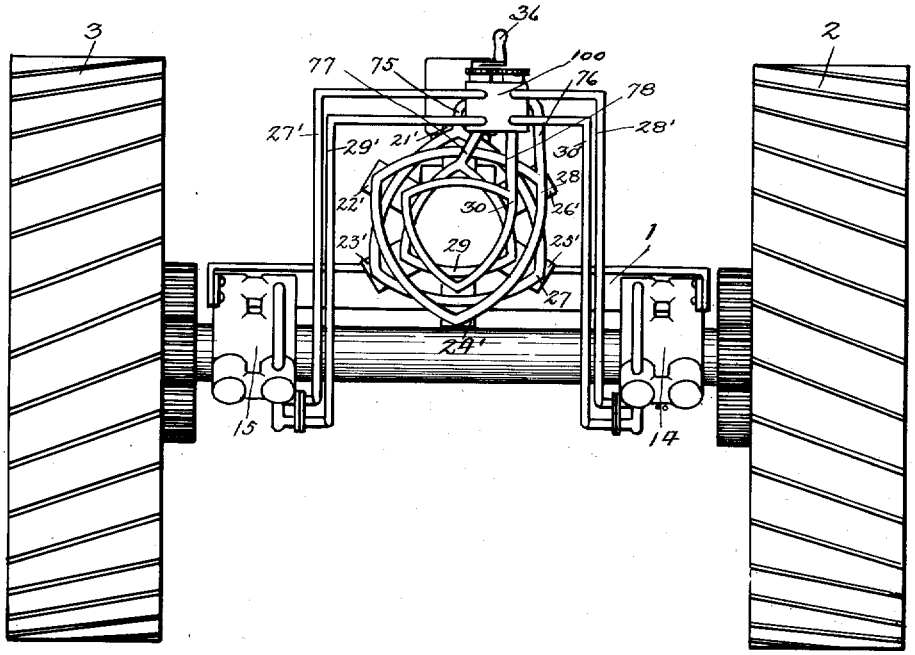
Fig. 3 is a rear elevation with parts cut away to show more clearly the driving mechanism.

It is readily seen that where desired the vehicle may be provided with four wheels instead of three, the two trailing wheels being of the swivel type, preferably as above described. To illustrate this more clearly, I have shown in Figs. 1 and 2, in dotted lines, the outlines of two such trailing wheels.

Figure 8:
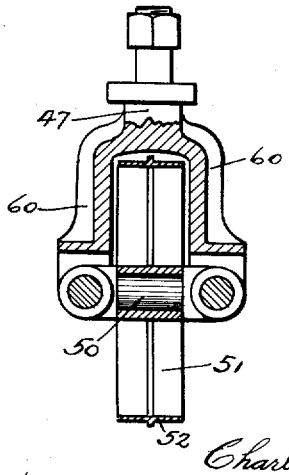
Figure 9:
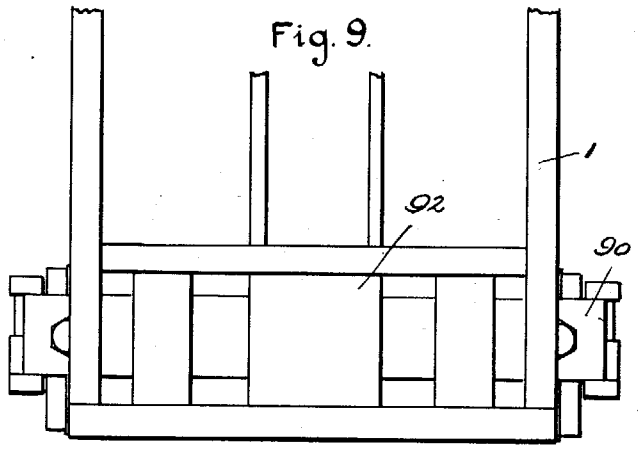
Figure 11:
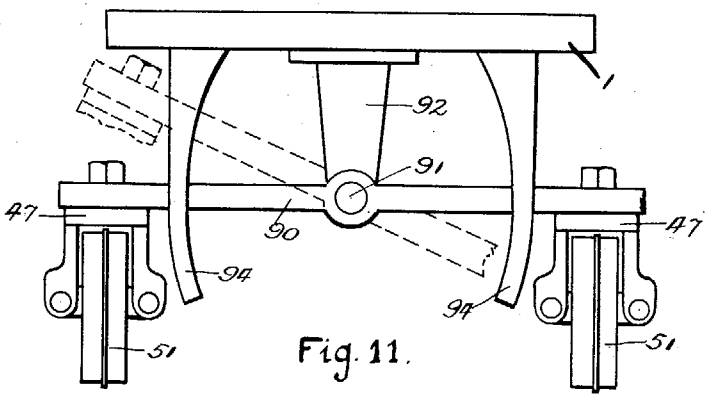
Figure 10:
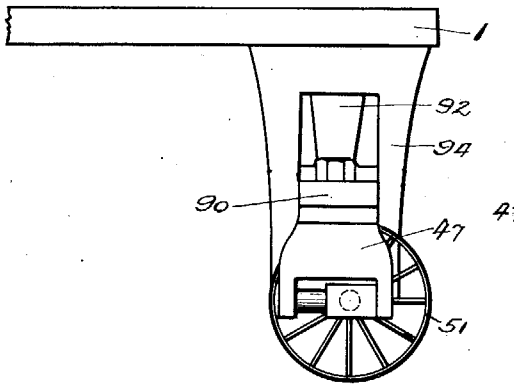

However, where a four-wheeled vehicle has to pass over a rough surface it is best to provide means for permitting the wheel supports to have sufficient flexibility to allow the wheels to adapt themselves to the road surface. In the four-wheel arrangement shown in Figs. 1 and 2, this would only be possible if the frame itself were made sufficiently flexible. Such a flexibility of the frame, however, in some cases would interfere with the alinement of the driving machinery. I therefore find it advantageous to provide a practically rigid frame connected rigidly to the front axle and to connect the trailing wheels to the rear of the frame through a horizontally pivoted dead axle, and I have shown in Figs. 9, 10 and 11 such a construction. In this case the dead axle 90 is horizontally pivoted by the pin 91 to the hanger 92, fastened to the frame 1. Rotatably secured to each end of the axle 90, is a swivel 47 carrying a trailing wheel 51, which is here shown as previously described and illustrated in Figs. 7 and 8. The dead axle 90 may be braced against forces tending to twist it in a horizontal plane, due to striking obstacles, etc., by the vertical guides 94.

As previously explained, I have for convenience here shown the pump cylinders as grouped into only two sets, but it is obvious that by a mere change in the manifolds, the cylinders may be grouped into three sets of two cylinders each, or into $n$ sets of $m$ cylinders, thereby providing means for forcing fluid through as many separate circuits as desired, controlled by a suitable number of coöperating valves, and if desired, the circuits may be fed by the same or different numbers of cylinders. It is also obvious that the cylinders may be all of the same size, or each may be different from any other.

I claim:

1. In a motor vehicle, the combination of a plurality of independently rotatable driving wheels, a plurality of separate hydraulic motors, a separate fluid pressure generating element for each of said motors, connections between said elements and said motors comprising a valve mechanism adapted to normally maintain a separate connection between each motor and its generating element and adjustable to establish communication between the connections of said separate motors as desired.

2. In a motor vehicle the combination with a plurality of separate driving wheels of a separate hydraulic motor for each driving wheel, a separate fluid pressure generating element for each motor, passages for conveying fluid under pressure from said elements to said motors, and a valve in said passages adapted to maintain the passages between each generating element and its motor separate and adjustable to interconnect the passages from said generating elements and partially close the passages to one of the motors.

3. In a motor vehicle the combination with a plurality of separate driving wheels of a separate hydraulic motor for each driving wheel, a separate fluid pressure generating element for each motor, passages for conveying fluid under pressure from said elements to said motors, and a valve in said passages adapted to maintain the passages between each generating element and its motor separate and adjustable to interconnect the passages from said generating elements to the desired extent and partially close the passages to one of the motors a corresponding extent.

4. In a motor vehicle the combination of a plurality of separate driving wheels, a plurality of separate motors therefor, separate fluid pressure generating elements for said motors, means for simultaneously varying the capacity of said pressure generating elements, passages connecting said elements and motors in separate fluid circuits, and means for interconnecting and disconnecting said circuits.

5. In a motor vehicle the combination of independently rotatable driving wheels on the opposite sides thereof, a separate hydraulic motor for each of said wheels, a multiple cylinder pump for supplying fluid pressure to said motors, passages connecting said motors with different cylinders of said pump to form independent fluid circuits each having its pressure and suction sides, and a valve mechanism in said passages adapted to interconnect the pressure sides of said separate circuits to any desired extent, and simultaneously interconnect the suction sides of said circuits to a corresponding extent.

6. In a motor vehicle the combination of independently rotatable driving wheels on the opposite sides thereof, a separate hydraulic motor for each of said wheels, a multiple cylinder pump for supplying fluid pressure to said motors, means for simultaneously varying the capacity of said cylinders, passages connecting said motors with different cylinders of said pump to form independent fluid circuits each having its pressure and suction sides, and a valve mechanism in said passages adapted to interconnect the pressure sides of said separate circuits to any desired extent and simultaneously interconnect the suction sides of said circuits to a corresponding extent.

7. In a motor vehicle the combination of a plurality of independently rotatable driving wheels, a plurality of separate hydraulic motors, a separate fluid pressure generating element for each of said motors, means for operating said separate generating elements in synchronism to deliver the same quantity of fluid under pressure in the same unit of time, connections between said elements and said motors comprising a valve mechanism adapted to normally maintain a separate connection between each motor and its generating element and adjustable to establish communication between the connections of said separate motors as desired.

8. In a motor vehicle the combination with a plurality of separate driving wheels of a separate hydraulic motor for each driving wheel, a separate fluid pressure generating element for each motor, means for operating said separate generating elements in synchronism to deliver the same quantity of fluid under pressure in the same unit of time, passages for conveying fluid under pressure from said elements to said motors, and a valve in said passages adapted to maintain passages between each generating element and its motor separate and adjustable to interconnect the passages from said generating elements and partially close the passage to one of the motors.

9. A motor vehicle comprising a plurality of independently rotatable driving wheels on opposite sides of the longitudinal axis of the vehicle, independent hydraulic motors for said wheels, separate sources of fluid pressure for operating said motors, and means for controlling the fluid under pressure delivered to said motors to vary the relative speeds thereof and effect the steering of the vehicle.

10. A motor vehicle comprising a plurality of independently rotatable driving wheels on opposite sides of the longitudinal axis of the vehicle, independent hydraulic motors for said wheels, separate sources of fluid pressure for operating said motors, and means for controlling the fluid under pressure delivered to said motors to maintain definite relative speeds of said motors irrespective of variations in the torque required by the respective wheels.

Signed at Buffalo, in the county of Erie and State of New York, this 22nd day of May, 1918.

CHARLES M. MANLY.